United States Patent [19]

Takahashi

[11] Patent Number: 4,615,231

[45] Date of Patent: Oct. 7, 1986

[54] PLANETARY GEAR UNIT

[75] Inventor: Shigeo Takahashi, Anjo, Japan

[73] Assignee: Aisin Seiki Kabushiki Kaisha, Kariya, Japan

[21] Appl. No.: 708,854

[22] Filed: Mar. 6, 1985

[30] Foreign Application Priority Data

Mar. 30, 1984 [JP] Japan .................................. 59-061002

[51] Int. Cl.$^4$ ............................................. F16H 57/04
[52] U.S. Cl. ...................................... 74/467; 184/6.12
[58] Field of Search ................. 74/467, 791; 184/6.12

[56] References Cited

U.S. PATENT DOCUMENTS

| | | | |
|---|---|---|---|
| 2,247,732 | 7/1941 | Paton | 184/6.12 |
| 2,400,964 | 5/1946 | Vincent et al. | 184/6.12 |
| 2,498,828 | 2/1950 | Sheppard | 74/801 |
| 3,053,115 | 9/1962 | Cartwright et al. | 184/6.12 |
| 3,146,629 | 9/1964 | Schmitter | 74/467 X |
| 3,319,491 | 5/1967 | Simpson | 74/740 |
| 3,396,610 | 8/1968 | Rich, Jr. et al. | 74/740 |
| 3,407,686 | 10/1968 | Tuck et al. | 74/467 X |
| 3,539,035 | 11/1970 | Ignaz | 74/467 X |
| 3,583,526 | 6/1971 | Mulleder | 74/467 X |
| 3,834,248 | 9/1974 | Caliri | 74/467 X |
| 3,939,733 | 2/1976 | Wetrich | 74/740 |
| 4,222,289 | 9/1980 | Watanabe et al. | 74/740 |
| 4,418,777 | 12/1983 | Stockton | 74/467 X |
| 4,459,869 | 7/1984 | Bucksch | 74/467 |
| 4,480,492 | 11/1984 | Fujioka et al. | 74/467 |

FOREIGN PATENT DOCUMENTS 1212929 11/1970 United Kingdom ................ 384/420

Primary Examiner—Kenneth J. Dorner
Assistant Examiner—Joseph M. Rolnicki
Attorney, Agent, or Firm—Oblon, Fisher, Spivak, McClelland & Maier

[57] ABSTRACT

A planetary gear unit including a first planetary gear unit having an arm member supporting a pinion shaft, the pinion shaft supporting a planet pinion. The arm member includes an extending portion which extended to a point adjacent a sun gear engaged with the planet pinion. A second planetary gear unit is positioned adjacent the planet pinion of said first planetary gear unit and a thrust washer is disposed between the arm member and the second planetary gear unit. A radiating conduit is formed on the contacting surface of the thrust washer or the arm member for supplying lubricating oil to an inner surface of the planet pinion from a point adjacent the sun gear.

6 Claims, 7 Drawing Figures

4,615,231

PLANETARY GEAR UNIT

BACKGROUND OF THE INVENTION

1. Field of the Invention

This invention relates generally to a planetary gear unit and more specifically to a planetary gear unit for an automatic transmission of a motor vehicle, the transmission including a passage introducing lubricating oil into a portion of the transmission wherein a plurality of planet pinions are rotatably disposed.

2. Description of the Prior Art

In general, it is well known that each of a plurality of planet pinions disposed in a planetary gear unit is rotatably mounted on a respective pinion shaft supported on an arm member, whereby the planet pinions revolve around a sun gear of the planetary gear unit.

Therefore, in a conventional planetary gear unit, passage means are used for introducing lubricating oil into the inner surface of each planet pinion and which comprises a first conduit for drawing lubricating oil from a surrounding portion of a sun gear is provided in a plate attached to the arm member and a second conduit for introducing the lubricating oil from the first conduit into the inner surface of each planet pinion. Alternatively, a first conduit formed by drilling the arm member for drawing lubricating oil from a surrounding portion of a sun gear is communicated with the second conduit for introducing lubricating oil from the first conduit into the inner surface of each planet pinion.

In these types of gear units, however, the conduit for drawing lubricating oil in the former example is formed with the additional plate which thus requires an additional member to be used in the gear unit. This can cause an increase in the number of parts required and scaling up of the gear unit. On the other hand, the first conduit for drawing lubricating oil in the latter example is formed by providing a conduit in the arm member. As a result, accurate formation of the first conduit communicated with the second conduit is difficult.

SUMMARY OF THE INVENTION

It is an object of the present invention to avoid the aforementioned and other disadvantages of a conventional planetary gear unit.

More particularly, an object of the present invention is to provide an improved planetary gear unit which is a simple mechanism and avoids the conventional increase in the number of parts, increase in weight and scaling-up thereof.

Another object of the present invention is to provide a planetary gear unit which can introduce sufficient lubricating oil into an inner surface of a plurality of planet pinions due to the centrifugal effect thereof and maintain smooth operation thereof.

These and other objects are accomplished by the planetary gear unit of the present invention, comprising an arm member in a first planetary gear unit supporting a pinion shaft upon which is rotatably mounted a planet pinion, the arm member having a portion extending to a point adjacent a sun gear engaged with the planet pinion; a second, adjacent planetary gear unit facing the planet pinion of the first planetary gear unit; a thrust washer disposed between the arm member and the second planetary gear unit, a plurality of radiating bevels cut in various directions on the contacting surface of the thrust washer or the arm member so as to communicate an inner circumferential surface of an extended portion of the arm member with an inner surface of the pinion shaft via a conduit formed in the pinion shaft.

Consequently, in the present invention, it is not necessary to provide an additional member for forming a conduit for drawing lubricating oil from the surrounding portion of a sun gear or a conduit, for example formed by drilling, in the arm member for drawing lubricating oil so as to communicate such lubricating oil with the inner surface of planet pinion.

Furthermore, in the present invention, when the planet pinion revolves around the sun gear, the lubricating oil drawn by radiating bevels is sufficiently supplied to the inner circumference of the planet pinion via the conduit due to the centrifugal effect of planetary gear unit wherein the inner circumference of the extending portion of arm member is located adjacent the sun gear.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
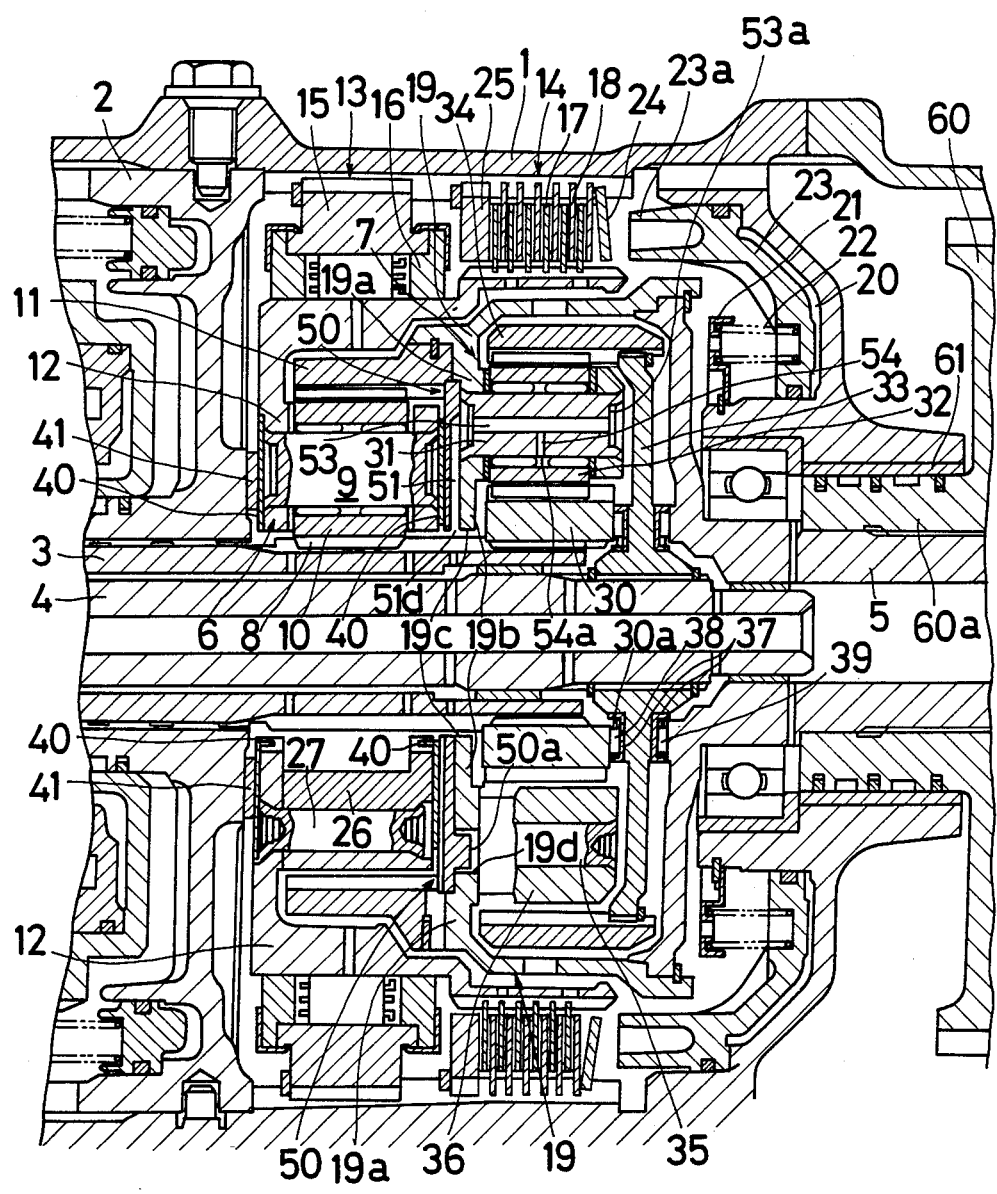
FIG. 1 is a cross-sectional view of a planetary gear unit according to one embodiment of the present invention.

As shown in FIG. 1, a planetary gear unit 7 for an automatic transmission of a motor vehicle comprises an arm member 19a supporting a pinion shaft 31 (four pinion shafts 31 being utilized) in turn having rotatably mounted thereon a planet pinion 32, arm member 19a having an extending portion 19b which extends to a position adjacent the central axis of a sun gear 30 engaged with the planet pinion 32, a second, adjacent planetary gear unit 6 and a thrust washer 50 disposed between the arm member 19a and the second planetary gear unit 6. The planetary gear units 6, 7 for respectively transmitting a variable speed rotational force of intermediate shafts 3, 4 to an output shaft 5 are installed rearwardly of a center support 2 fixed to a transmission case 1. The first planetary gear unit 6 comprises a front sun gear 8 positioned on the outer circumference of intermediate shaft 3, a planet pinion 10 rotatably mounted on a pinion shaft 9, i.e., one of four pinion shafts, and a ring gear 11 unitarily rotated with the output shaft 5 via a ring gear 19 of planetary gear unit 7. A front carrier 12 supporting the pinion shaft 9 extends in a radial direction and is connected to a one way clutch 13 and a brake device 14 of a multiple plate type. The front carrier 12 which operates as an inner race is rotatably fitted in an outer race 15 via a retainer 16. A multiple friction disk 17 of brake device 14 is fixed to outer circumference of front carrier 12. A multiple friction brake plate 18 fixed to transmission case 1 is engageable with multiple friction disk 17. When the multiple friction disk 17 is engaged with the brake plate 18, the revolution of planet pinion 10 around front sun gear 8 is stopped. Considering the situation of involving the revolution of planet pinion 10, when operating oil is introduced into an oil chamber 20 via a passage (not shown), a brake piston 23 of brake device 14 moves in a leftward direction against a return spring 22 disposed between the brake piston 23 and a spring retainer 21 fixed to transmission case 1. Then the brake piston 23 depresses a cushion plate 24 of brake device 14, whereby the brake plate 18 and the disk 17 are in contact with the cushion plate 24 and a pressure plate 25 of brake device 14. Thus, brake device 14 is operated. Reference numeral 26 denotes, for example, a carrier fixed to the front carrier 12 between the pinion shaft 9 via a pin 27. Reference numeral 40 is a washer plate for absorbing a thrust force caused at opposite ends of pinion shaft 9 when the brake device 14 is operated. Reference numeral 41 denotes a thrust washer for absorbing a thrust force caused at the washer plate 40 and the center support 2.

The second planetary gear unit 7 located rearward of first planetary gear unit 6 includes a rear sun gear 30 engaged with the intermediate shaft 3 via a spline member, a rear carrier 19 fixed to the output shaft 5 and which includes the arm member 19a, and a ring gear 34 fixed to the intermediate shaft 4 via a hub 33. Engaging adjacent pinion shafts 31, each of which are supported a respective arm member 19a, is a carrier 36 fixed to the rear carrier 19. Thrust needle bearings 38, 39 are disposed on opposite ends of the hub 33 via a bearing race respectively rotatably mounted at a rear end surface 30a of rear sun gear 30 and a front end surface of output shaft 5 in a direction of thrust.

The rear carrier 19 unitarily formed with the arm member 19a is provided so as to surround the ring gear 34 and is unitarily rotatable with output shaft 5.

The arm member 19a is unitarily formed with the rear carrier 19 and has an extending portion 19b which extends to a point adjacent rear sun gear 30 so that an inner end 19c of extending portion 19 faces the rear sun gear 8 with a prescribed clearance.

A thrust washer 50 for absorbing a thrust force from first planetary gear unit 6 is disposed between the front end of arm member 19 and first planetary gear unit 6, and the positioning thereof is such that a projection 50a formed on the thrust washer 50 fits within a hole 19d formed in the arm member 19a.

As shown in FIGS. 1-4 oil conduits in the form four grooves 51 radiating in various directions are formed on a rear end surface of thrust washer 50 and are uniformly spaced, and a pair of bevels 51a, 51b are formed on opposite ends of grooves 51. The degree of inclination of bevel 51a located at a forward end in the rotational direction of thrust washer 50 decreases in the radially inward direction of bevel 51a.

Figure 5:
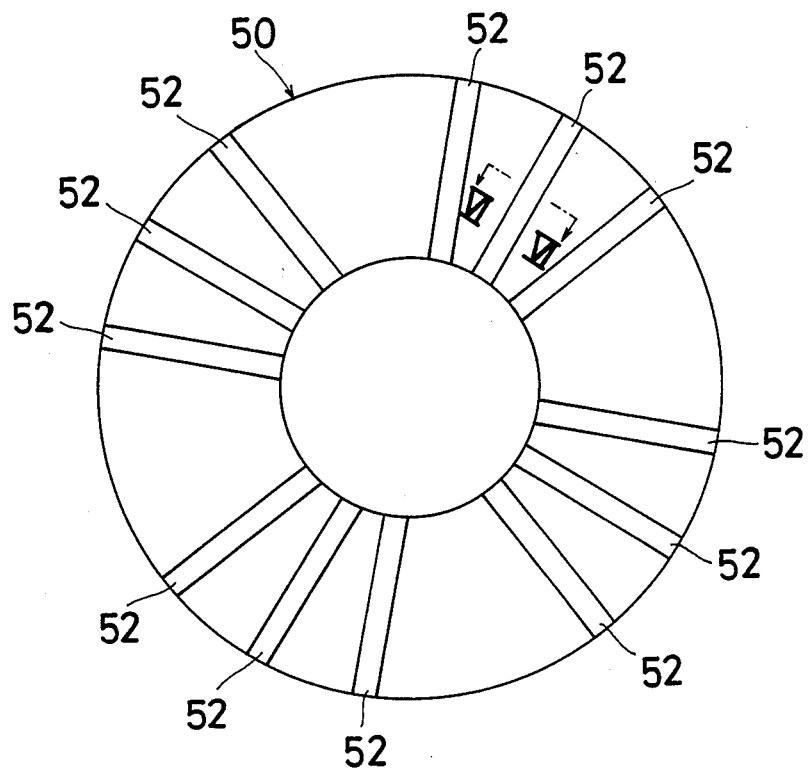
FIG. 5 shows a front view of a thrust washer according to one embodiment of the present invention.
Figure 6:
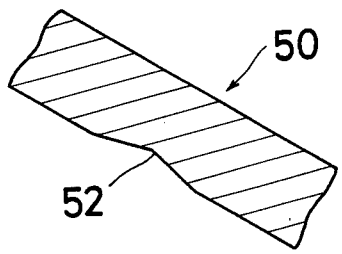
FIG. 6 is a cross-sectional view taken along line VI—VI of FIG. 5.

As shown in FIG. 5 and FIG. 6, four sets of grooves 52, namely twelve grooves, are formed so as to extend in various directions on the front end surface of thrust washer 50 and are uniformly spaced.

As shown in FIG. 1, an axial conduit 53 is provided in pinion shaft 31 that is in communication with the thrust washer 50 along the outer circumference of the rear end surface of thrust washer 50.

A radial conduit 54 is formed in pinion shaft 31 and is communicated with an inner surface portion of planet pinion 32 and is also communicated with conduit 53. The right end of conduit 53 is closed by a plug 53a.

The outer circumference of boss portion 60a of a parking gear 60 engaged with the output shaft 5 is rotatably mounted within the transmission case 1 via a sleeve 61.

When power is transmitted to the planet pinion 32 from intermediate gears 3, 4 via rear sun gear 30 or rear ring gear 34, the planet pinion 32 revolves around rear sun gear 30 with a prescribed ratio in response to the operation of planetary gear unit 6. In such condition, the pinion shaft 31, the rear carrier 19, the arm member 19a and the thrust washer 50 unitarily rotates around the central axis of intermediate shafts 3, 4, respectively.

Lubricating oil located adjacent inner end 19c of extending portion 19b is drawn into the radiating grooves 51 by a centrifugal effect, and is supplied to the inner surface of planet pinion 32 via conduits 53, 54.

Thrust washer 50 includes an inner aperture 50b which define the radially inner ends 51d of radiating grooves 51. The centrifugal effect on the oil in the radiating grooves 51 is such that the lubricating oil positioned adjacent front sun gear 8 and rear sun gear 30 is radially distributed and actively supplied to the inner surface of planet pinion 32 via radiating grooves 51 and conduits 53, 54.

Figure 2:
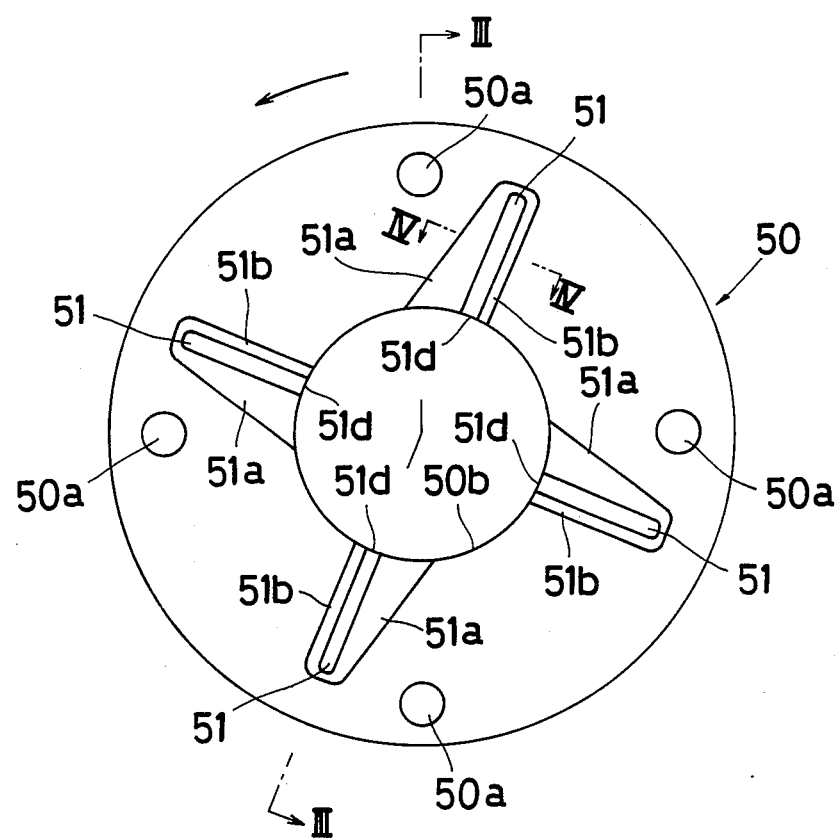
FIG. 2 shows a rear view of thrust washer according to the present invention.
Figure 3:
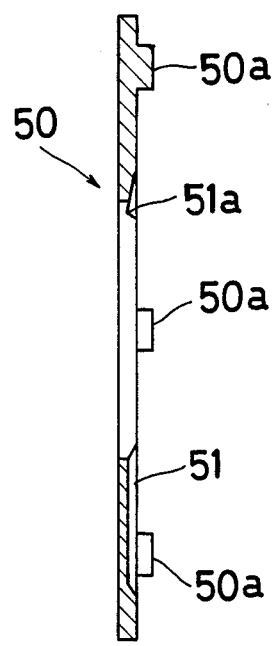
FIG. 3 is a cross-sectional view taken along line III—III of FIG. 2.
Figure 4:
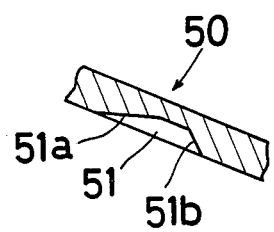
FIG. 4 is a cross-sectional view taken along IV—IV of FIG. 2.

In this embodiment, a bevel 51a is formed on radiating grooves 51 on the upstream side in the rotational direction shown by the arrow in FIG. 2 of thrust washer 50 and the slope of angle of bevel 51a changes to a more gradual slope in the radially inward direction of bevel 51a, whereby the supply of lubricating oil to planet pinion 32 increases upon the occurrence of a higher rotational speed of planet pinion 32.

Figure 7:
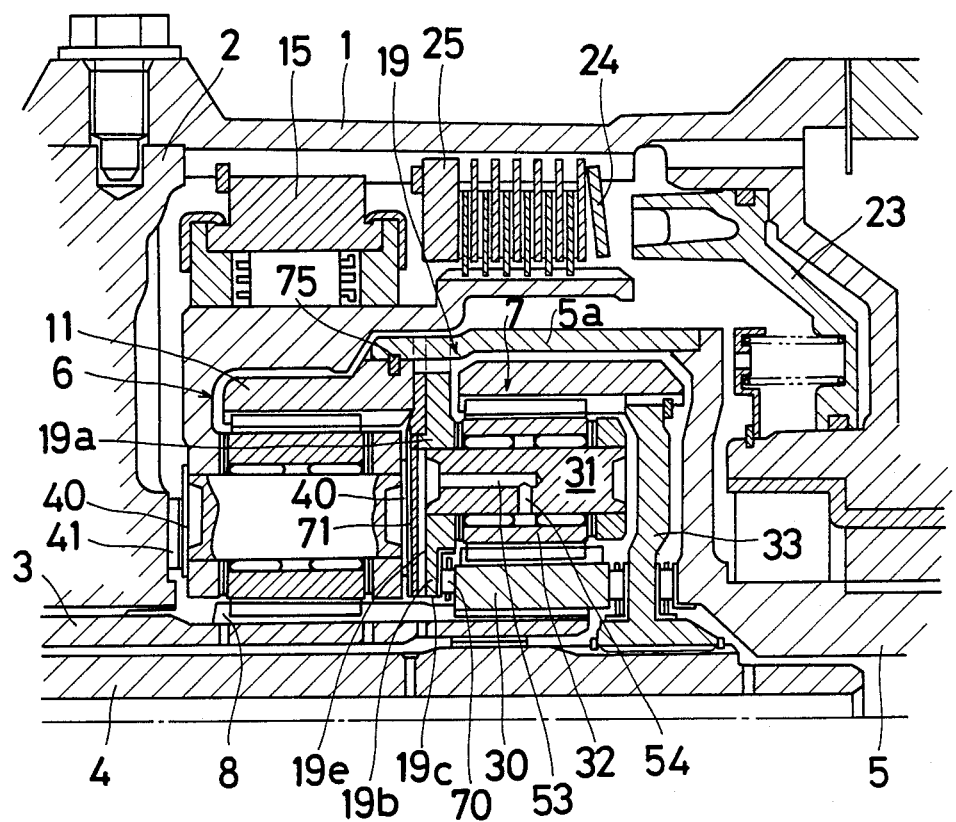
FIG. 7 is a cross-sectional view of a planetary gear unit of a second embodiment of the present invention.

As shown in FIG. 7, in this second embodiment of the present invention oil conduits in the form of, radiating grooves 19e similar to rotating grooves 51 are formed on a front end surface of the arm member 19a contacted with a thrust washer 71 made of polyamide resin. A cylindrical thrust bearing 70 is disposed between the extending portion 19b of arm member 19a and rear sun gear 30. The thrust washer 71 and the arm member 19a are engaged with a connecting member 5a fixed to the output shaft 5 and positioning thereof is accomplished together with the ring gear 11 by a snap ring 75. The function of radiating grooves 19e is similar to that of radiating grooves 51 according to the first embodiment of the present invention.

According to the present invention, the second planetary gear unit may be replaced by a frictional engaging device. Furthermore, in the embodiments of the present invention, the arm member is installed between first and second adjacent planetary gear units required to supply lubricating oil to the inner circumference of the planet pinion but may instead be located on the outer circumference of one of the gear units.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A planetary gear unit for the transmission of a motor vehicle, comprising:

a first planetary gear unit which includes a pinion shaft, a planet pinion rotatably mounted on said pinion shaft, a sun gear engaging said planet pinion, and an arm member supporting said pinion shaft and having an extending portion extending to a point adjacent said sun gear;

a thrust washer contacting said arm member, said thrust washer having a plurality of radiating conduit means formed on a contacting surface thereof so as to communicate an inner circumference of said extending portion of said arm member with said pinion shaft, said pinion shaft having a conduit formed therein so as to communicate with said plurality of radiating conduit means with an inner surface of said planet pinion wherein said plurality of radiating conduit means further comprises a plurality of uniform spaced bevel surfaces and a plurality of grooves in communication with said bevel surfaces.

2. A planetary gear unit as set forth in claim 1, further comprising a second planetary gear unit which is located adjacent said first planetary gear unit wherein said thrust washer of said first planetary gear unit is positioned between said arm member of said first planetary gear unit and said second planetary gear unit.

3. A planetary gear unit according to claim 1, wherein each of said plurality of bevel surfaces are positioned along and in front of each of said plurality of grooves in a direction of rotation of said thrust washer and wherein each of said bevel surfaces is inclined so as to decrease in slope in a radially inward direction of said thrust washer.

4. A planetary gear unit according to claim 1, wherein said arm member includes a hole formed therein and said thrust washer has a projection extending therefrom which is fitted in said hole formed in said arm member.

5. A planetary gear unit according to claim 1, wherein each of said plurality of bevel surfaces are positioned along and in front of each of said plurality of grooves in a direction of rotation of said arm member and wherein each of said bevel surfaces is inclined so as to decrease in slope in a radially inward direction of said arm member.

6. A planetary gear unit for the transmission of a motor vehicle, comprising:

a first planetary gear unit which includes a pinion shaft, a planet pinion rotatably mounted on said pinion shaft, a sun gear engaging said planet pinion, and an arm member supporting said pinion shaft and having an extending portion extending to a point adjacent said sun gear, said arm member including a plurality of radiating conduit means formed on a surface thereof so as to communicate an inner circumference of said extending portion of said arm member with said pinion shaft; and a thrust washer in contact with said arm member, said pinion shaft having a conduit formed therein so as to communicate said plurality of radiating conduit means with an inner surface of said planet pinion wherein said plurality of radiating conduit means further comprises a plurality of uniformly spaced bevel surfaces and a plurality of grooves in communication with said bevel surfaces.

* * * * *